(12) United States Patent
Bauer

(10) Patent No.: US 8,727,358 B2
(45) Date of Patent: May 20, 2014

(54) TORSION KEY SADDLE

(71) Applicant: Time Zone Consulting Corp., San Clemente, CA (US)

(72) Inventor: Cordell Bauer, San Clemente, CA (US)

(73) Assignee: Time Zone Consulting Corp., San Clemente, CA (US)

( * ) Notice: Subject to any disclaimer, the term of this patent is extended or adjusted under 35 U.S.C. 154(b) by 0 days.

(21) Appl. No.: 13/672,581

(22) Filed: Nov. 8, 2012

(65) Prior Publication Data

US 2013/0119621 A1 May 16, 2013

Related U.S. Application Data

(60) Provisional application No. 61/558,327, filed on Nov. 10, 2011.

(51) Int. Cl.
*B60G 17/00* (2006.01)

(52) U.S. Cl.
USPC .......................................... 280/6.157; 29/238

(58) Field of Classification Search
USPC ......... 280/6.157; 29/238, 240, 242, 250, 256; 269/3
See application file for complete search history.

(56) References Cited

U.S. PATENT DOCUMENTS 3,737,970 A * 6/1973 Tracy ............................... 29/225
4,526,066 A * 7/1985 Steck ............................... 81/486

* cited by examiner

*Primary Examiner* — Faye M. Fleming
(74) *Attorney, Agent, or Firm* — K. David Crockett, Esq.; Paul J. Backofen, Esq.; Crockett & Crockett, PC

(57) ABSTRACT

A torsion key saddle enables a user to readily change the suspension performance characteristic and the suspension lift in a vehicle with independent torsion suspension without the need to replace the torsion keys. Use of torsion key saddles enables each wheel to be adjusted fully between the extremes available using the six possible positions for a torsion key with a hex torsion bar socket.

13 Claims, 2 Drawing Sheets

TORSION KEY SADDLE

RELATED APPLICATIONS

This application claims priority from copending U.S. Provisional Application 61/558,327 filed Nov. 10, 2011.

FIELD OF THE INVENTIONS

The inventions described below relate to the field of automotive accessories and more particularly to the field of aftermarket parts for motor vehicle suspension.

BACKGROUND OF THE INVENTIONS

In conventional motor vehicles there are a variety of techniques for providing flexible suspension for each wheel of the vehicle to provide a smooth ride. In many vehicles the suspension of each wheel is dependent on a torsion bar removably secured to the vehicle frame and to the wheel suspension components. When a vehicle owner desires to change the ride characteristics or suspension lift in a vehicle with independent torsion bar suspension, the owner needs to change the preload on the torsion bars. This is often accomplished by removing and replacing the torsion key for each wheel. Due to the stresses and the criticality of the torsion key, torsion keys are forged steel and are often very expensive to replace.

SUMMARY

A torsion key saddle as described below provides for the ability to readily change the suspension performance characteristic and the suspension lift in a vehicle with independent torsion suspension without the need to replace the torsion keys. Use of torsion key saddles enables each wheel to be adjusted fully between the extremes available using the six possible positions for a torsion key with a hex torsion bar socket.

A torsion key saddle as described below includes two or more alignment elements oriented along the long axis of the generally wedge shaped torsion key saddle. The multiple alignment elements permits the torsion key saddle to be used in multiple positions to increase or decrease the preload in controllable increments.

DETAILED DESCRIPTION OF THE INVENTIONS

Figure 1:
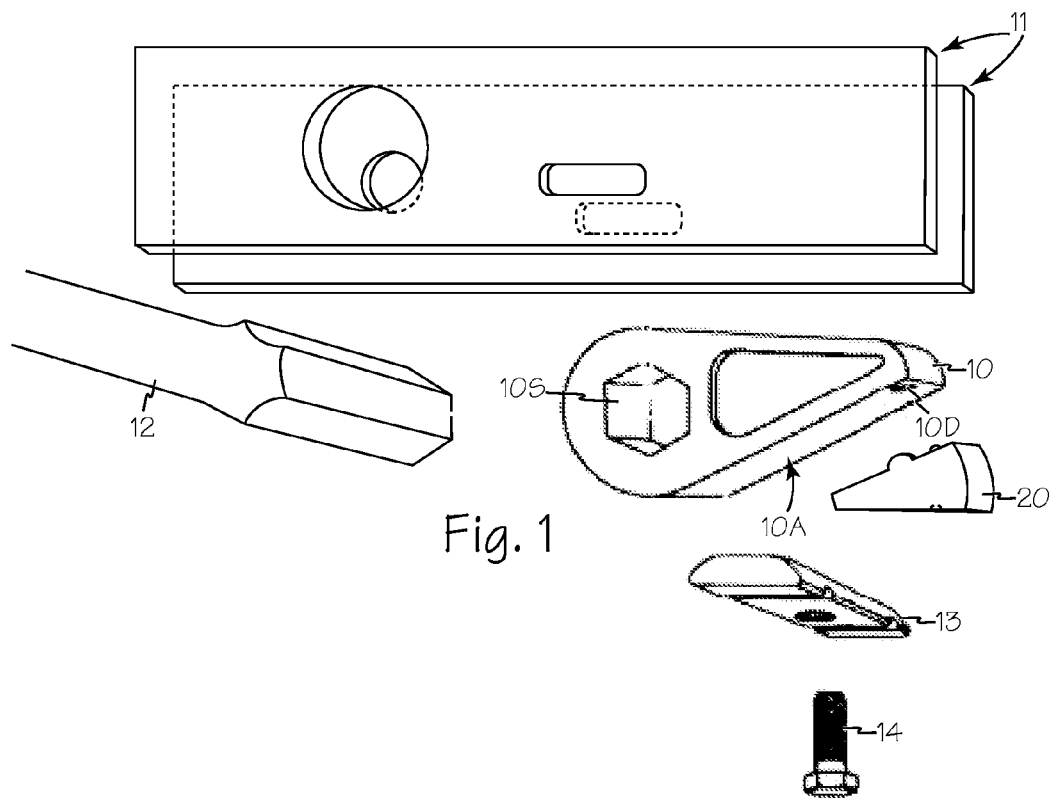
FIG. 1 is an exploded view of the torsion suspension elements for a single wheel including a torsion key saddle.

The elements used to preload and secure a torsion bar to a vehicle frame are illustrated in FIG. 1. Torsion key 10 is located between frame elements 11, where socket 10S of torsion key 10 engages torsion bar 12. Torsion stop 13 engages frame elements 11 and prevents rotation of torsion key 10 as urged by torsion bar 12. Adjustment bolt 14 engages a threaded hole in torsion stop 13 and extends through the torsion stop to engage torsion key 10 at dimple 10D to provide fine adjustment of the preload on torsion bar 12. Torsion key saddle 20 is located between first surface 10A of the torsion key and adjustment bolt 14.

Figures 2, 3, 4:
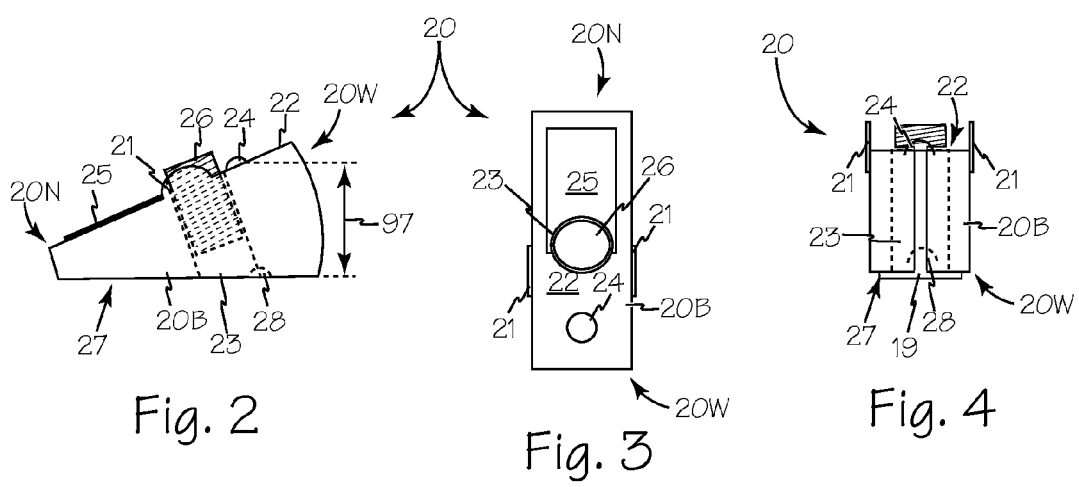
FIG. 2 is a side view of a torsion key saddle.
FIG. 3 is a top view of the torsion key saddle of FIG. 2.
FIG. 4 is an end view of the torsion key saddle of FIG. 2.

Referring now to FIGS. 2, 3 and 4, torsion key saddle 20 includes tabs or wings or other suitable retaining members such as tabs 21 to prevent misalignment between the torsion key saddle and a torsion key. A torsion key saddle such as torsion key saddle 20 includes a generally wedge shaped body 20B with a narrow end 20N and a wide end 20W, however, any other suitable shape may be adopted. Mating surface 22 of torsion key saddle 20 may be shaped to correspond to the shape of first surface 10A of the torsion key. Mating surface 22 may also includes locating nub such as nub 24 which is sized and oriented to engage the adjustment dimple of the torsion key such as dimple 10D of torsion key 10 for torsion keys that include locating nubs and dimples. For some torsion keys locating nubs and dimples are not required.

Figure 5:
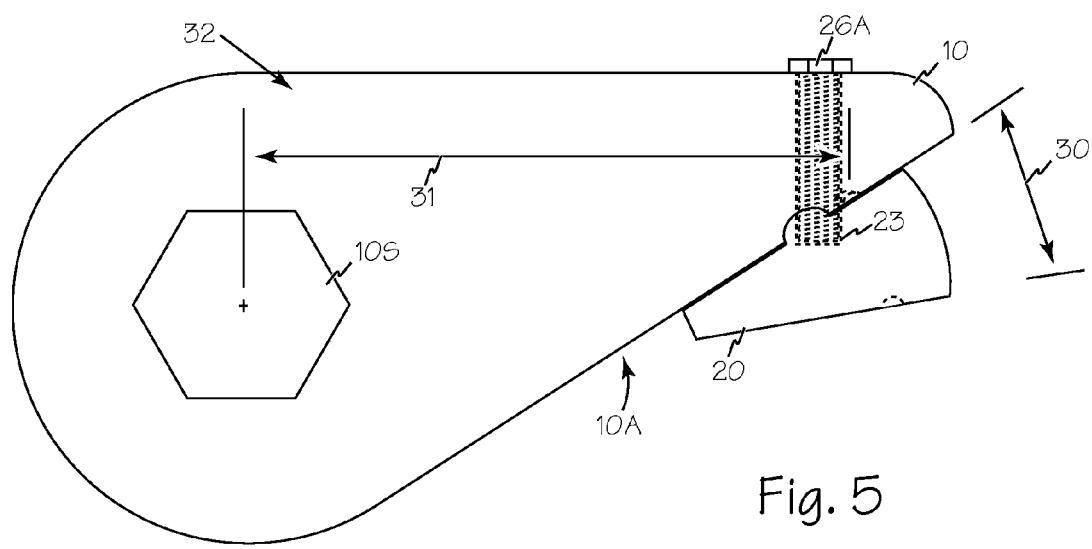
FIG. 5 is a side view of a torsion key saddle engaging a torsion key.

Torsion key saddle 20 may be secured to a torsion key using any suitable attachment or securing means such as an adhesive or an engagement device such as a screw, bolt or clip. Adhesive layer 25 may be secured to mating surface 22 to removably secure the torsion key saddle to the torsion key during installation of the torsion key saddle. Alternatively, torsion key saddle 20 may be secured to a torsion key using bolt 26 or clip 19 through threaded socket 23. Socket 23 may include serrations or other features to enable rotation and removal of bolt 26 in the presence of corrosion or other debris in socket 23. Bolt 26 may engage a threaded socket in a torsion key or may pass through the torsion key as illustrated in FIG. 5 by bolt 26A. Lower surface 27 of a torsion key saddle such as torsion key saddle 20 includes one or more adjustment dimples such as dimple 28 for engaging the adjustment bolt. Alternately, dimples such as dimple 28 may be replaced by a threaded socket such as socket 29 of FIG. 6. Threaded socket 29 engages adjustment bolt 14.

Referring now to FIG. 5, torsion key 10 is illustrated with torsion key saddle 20 engaged for use. Torsion key 10 has a generally hexagonal socket 10S for engaging a torsion bar. The hexagonal shape permits a torsion key to raise or lower a wheel's lift in increments of 60° corresponding to the faces of socket 10S and torsion bar 12. The thickness 30 of torsion key saddle 20 is a function of the length 31 of lever arm 32 formed by torsion key 10 from the center of socket 10S and a 30° angle which is half of the angle between facets of a hexagonal socket. The functional relationship is similar for torsion keys having sockets with other shapes.

Figure 6:
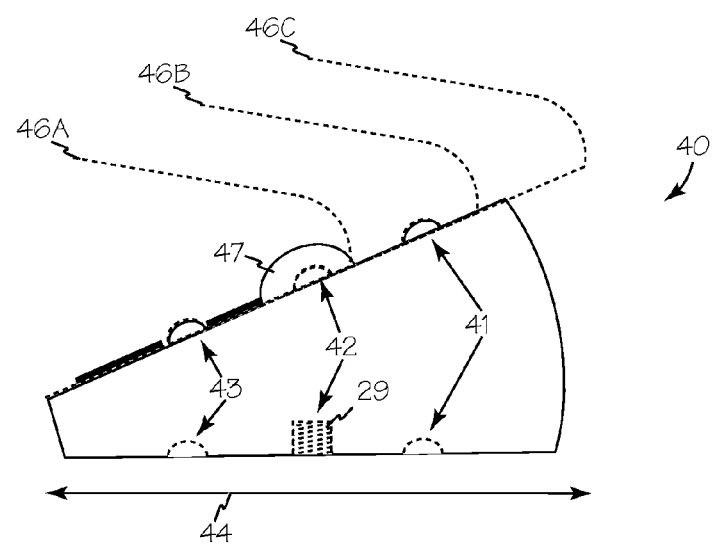
FIG. 6 is a side view of an alternate torsion key saddle.

Referring now to FIG. 6, torsion key saddles such as torsion key saddle 40 may include two or more pairs of alignment or locating elements such as alignment pairs 41, 42 and 43, each pair of alignment elements comprising a locating nub and dimple or threaded socket. Each pair of locating elements such as element pairs 41, 42 and 43 are located along long axis 44. The orientation of the alignment element pairs along long axis 44 enables torsion key saddle 40 to engage a torsion key such as in position 46A, position 46B or position 46C. The generally wedge shape of torsion key saddle 40 combined with the multiple alignment pairs permits a single torsion key saddle to provide a wide range of torsion bar preload adjustment independent of the use of the adjustment bolt. Similarly each torsion key saddle may have multiple pairs of tabs, wings or other suitable alignment aids such as tabs 47.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A torsion key saddle comprising:
   a body with a long axis and a mating surface for engaging a torsion key and a lower surface for engaging a torsion stop; and
   means for securing the torsion key saddle to a torsion key;
   one or more tabs extending from the body to align the torsion key saddle with the torsion key; and
   two or more pairs of alignment elements, each pair of the two or more pairs of alignment elements including a locating nub and a locating dimple, wherein the alignment elements are aligned along the long axis of the body.

2. The torsion key saddle of claim 1 wherein the means for securing is adhesive.

3. The torsion key saddle of claim 1 wherein the means for securing is a threaded fastener.

4. The torsion key saddle of claim 1 wherein the means for securing is a bolt extending through the torsion key.

5. The torsion key saddle of claim 1 wherein the means for securing is a clip.

6. A torsion key saddle comprising:
   a body with a mating surface for engaging a torsion key and a lower surface for engaging a torsion stop;
   means for securing the torsion key saddle to a torsion key; and
   one or more tabs extending from the body to align the torsion key saddle with the torsion key.

7. The torsion key saddle of claim 6 further comprising:
   one or more locating nubs on the mating surface.

8. The torsion key saddle of claim 6 wherein the means for securing is adhesive.

9. The torsion key saddle of claim 6 wherein the means for securing is a threaded fastener.

10. The torsion key saddle of claim 6 wherein the means for securing is a bolt extending through the torsion key.

11. The torsion key saddle of claim 6 wherein the means for securing is a clip.

12. The torsion key saddle of claim 6 further comprising:
    one or more locating dimples on the lower surface.

13. The torsion key saddle of claim 12 wherein at least one of the one or more locating dimples on the lower surface is threaded to engage a torsion key adjustment bolt.

* * * * *